(12) United States Patent
Tsujimoto et al.

(10) Patent No.: US 7,322,602 B2
(45) Date of Patent: Jan. 29, 2008

(54) HORN SWITCH DEVICE, AIRBAG SYSTEM, AND STEERING WHEEL

(75) Inventors: Kei Tsujimoto, Tokyo (JP); Wataru Nakazawa, Tokyo (JP)

(73) Assignee: Takata Corporation, Tokyo (JP)

( * ) Notice: Subject to any disclaimer, the term of this patent is extended or adjusted under 35 U.S.C. 154(b) by 165 days.

(21) Appl. No.: 11/282,715

(22) Filed: Nov. 21, 2005

(65) Prior Publication Data

US 2006/0131850 A1   Jun. 22, 2006

(30) Foreign Application Priority Data

| Dec. 17, 2004 | (JP) | 2004-366356 |
| Jan. 19, 2005 | (JP) | 2005-011775 |
| Jun. 23, 2005 | (JP) | 2005-183679 |

(51) Int. Cl.
*B60R 21/16* (2006.01)

(52) U.S. Cl. .............. 280/731; 200/61.54; 200/61.55; 200/61.56; 74/552

(58) Field of Classification Search .............. 280/731; 200/61.54, 61.55, 61.56; 74/552
See application file for complete search history.

(56) References Cited

U.S. PATENT DOCUMENTS

| 5,410,114 A | 4/1995 | Furuie et al. |
| 6,062,592 A * | 5/2000 | Sakurai et al. ........... 280/728.2 |
| 6,299,201 B1 * | 10/2001 | Fujita ......................... 280/731 |
| 6,478,330 B2 * | 11/2002 | Fujita ......................... 280/731 |
| 6,508,485 B2 | 1/2003 | Kikuta et al. |
| 6,616,180 B2 * | 9/2003 | Schütz ....................... 280/731 |
| 6,688,637 B2 * | 2/2004 | Igawa et al. ............. 280/728.2 |
| 6,719,323 B2 * | 4/2004 | Kai et al. .................... 280/731 |
| 6,793,237 B2 * | 9/2004 | Derrick et al. ........... 280/728.2 |
| 6,881,911 B2 | 4/2005 | Sugimoto |
| 6,995,328 B2 * | 2/2006 | Sugimoto ................ 200/61.54 |
| 7,173,202 B2 * | 2/2007 | Tsujimoto et al. ....... 200/61.54 |
| 2002/0153714 A1 | 10/2002 | Kreuzer |
| 2004/0046367 A1 | 3/2004 | Schneider et al. |
| 2005/0012311 A1 | 1/2005 | Schneider et al. |

FOREIGN PATENT DOCUMENTS

| JP | 10100832 A | 4/1998 |
| JP | 11278280 A | 10/1999 |
| JP | 2001187576 A | 7/2001 |

(Continued)

*Primary Examiner*—Paul N. Dickson
*Assistant Examiner*—Toan C. To
(74) *Attorney, Agent, or Firm*—Manabu Kanesaka

(57) ABSTRACT

A horn switch device includes a retractable body, an unmoving body, first and second biasing members for biasing the retractable body in a restoring direction, and first and second contact members. The contact members are attached to, and move with, the retractable body, and are capable of contacting each other by movement of the retractable body. The first biasing member pushes the first contact member and the second contact member apart. The second biasing member pushes the second contact member toward the first contact member. When a module cover is depressed, the biasing members are compressed to bring the contact members into contact with each other, thereby sounding the horn. Since the biasing members are arranged in series, vehicle vibration can be absorbed, thereby preventing accidental contact of the contact members. The device facilitates positioning of the contact members, thereby simplifying assembly of a steering wheel and an airbag system.

12 Claims, 4 Drawing Sheets

FOREIGN PATENT DOCUMENTS

| | | |
|---|---|---|
| JP | 2001199300 A | 7/2001 |
| JP | 2001213326 A | 8/2001 |
| JP | 2001233159 A | 8/2001 |
| JP | 2001277976 A | 10/2001 |
| JP | 2001278060 A | 10/2001 |

* cited by examiner

HORN SWITCH DEVICE, AIRBAG SYSTEM, AND STEERING WHEEL

BACKGROUND OF THE INVENTION AND RELATED ART STATEMENT

The present invention relates to a horn switch, and in particular, it relates to a horn switch device provided in an airbag system and constructed such that, when depressed, a module cover is retracted to turn on a horn switch. The invention also relates to an airbag system and a steering wheel that include the horn switch device.

Driver-seat airbag systems mounted to car steering wheels are known in which when the module covers of the airbag systems are depressed, horn switches are turned on to sound horns. For example, Japanese Unexamined Patent Application Publication No. 10-100832 and Japanese Unexamined Patent Application Publication No. 2001-114057 describe airbag systems in which, when depressed, a module cover is retracted against the repulsive force of a spring to turn on a horn switch.

In the conventional horn switch devices, the spring has a single stage, so that the reaction force of the module cover is proportional to the pushing stroke of the module cover.

Accordingly, it is an object of the present invention to provide a horn switch device in which multistage (i.e., two-stage) springs arranged in series bias a retractable body such as a module cover to offer the advantage of improving operability.

It is also an object of the present invention to provide an airbag system and a steering wheel that include the horn switch device.

Further objects and advantages of the invention will be apparent from the following description of the invention and the associated drawings.

SUMMARY OF THE INVENTION

A horn switch device according to the present invention includes a retractable body that is retracted by depression by an occupant; an unmoving body that faces the retractable body; a biasing member interposed between the retractable body and the unmoving body, for biasing the retractable body in the restoring direction; and a pair of contact members capable of coming into or out of contact with each other by the movement of the retractable body. Both of the pair of contact members move with the retractable body. The contact members include a first contact member located toward the retractable body and a second contact member located toward the unmoving body. The biasing member includes a first biasing member that pushes the first contact member and the second contact member in a separating direction, and a second biasing member that pushes the second contact member toward the first contact member.

According to the invention, the first biasing member and the second biasing member are springs, each having a different spring constant.

According to a first embodiment of the horn switch device, the retractable body is a module cover of an airbag system.

In the first embodiment of the invention, the unmoving body is a member extending from a retainer of the airbag system.

According to a second embodiment of the horn switch device, the retractable body is an airbag system.

In the second embodiment of the invention, the unmoving body is a steering wheel or a member extending from the steering wheel.

In another embodiment of the invention, an airbag system includes a horn switch device according to one of the first and second embodiments of the invention.

In another embodiment of the invention, a steering wheel includes a horn switch device according to one of the first and second embodiments of the invention.

In still another embodiment of the invention, a steering wheel is equipped with an airbag system that includes a horn switch device according to one of the first and second embodiments of the invention.

In the horn switch device according to the invention, the contact members are apart from each other when the retractable body such as a module cover or an airbag system is in a restored position (undepressed state). When the retractable body is depressed, the contact members come into contact with each other, thereby sounding the horn.

The horn switch device of the invention is constructed in such a manner that a retractable body such as a module cover or an airbag generates a repulsive force against depression by first and second biasing members arranged in series. Accordingly, vibration from the vehicle body can easily be absorbed. This prevents any accidental contact of the contact members from the vibration even if the distance between the contact members is small.

When the spring constants of the biasing members are different, the spring having a smaller spring constant is first compressed when the retractable body is depressed, offering good operability. Briefly, the retractable body starts retraction only by slight depression.

According to the invention, the retractable body may be either a module cover or an airbag system. When the retractable body is a module cover, the unmoving body is preferably a member extending from a retainer. When the retractable body is an airbag system, the unmoving member is preferably a steering wheel or a member extending from the steering wheel.

DETAILED DESCRIPTION OF THE PREFERRED EMBODIMENTS

Embodiments of the present invention will be specifically described hereinafter with reference to the drawings.

Figure 1:
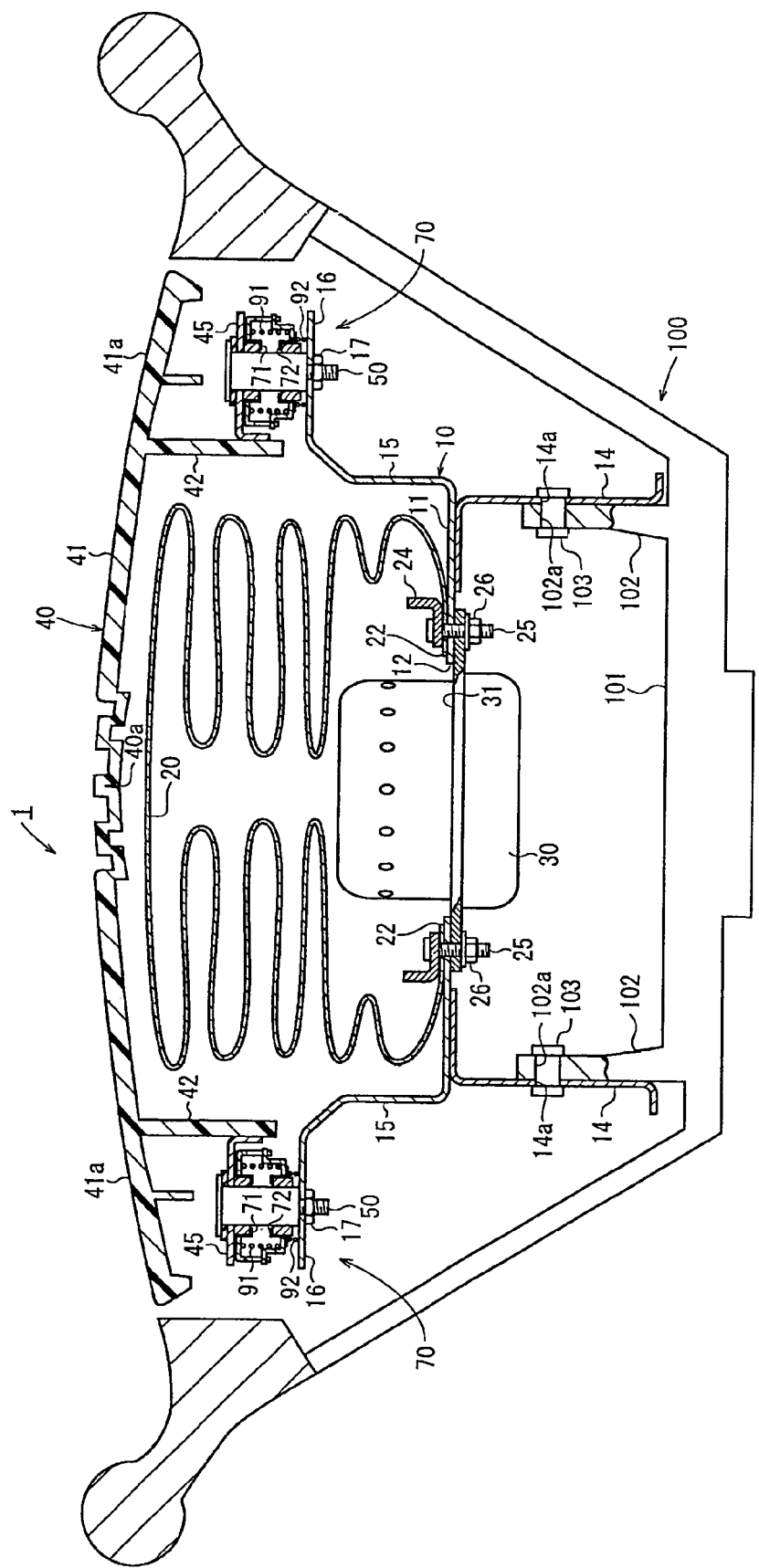
FIG. 1 is a cross-sectional view of a steering wheel equipped with an airbag system including a horn switch device according to a first embodiment of the invention.

FIG. 1 is a cross-sectional view of a steering wheel equipped with an airbag system including a horn switch device according to a first embodiment of the invention.

Figure 2A:
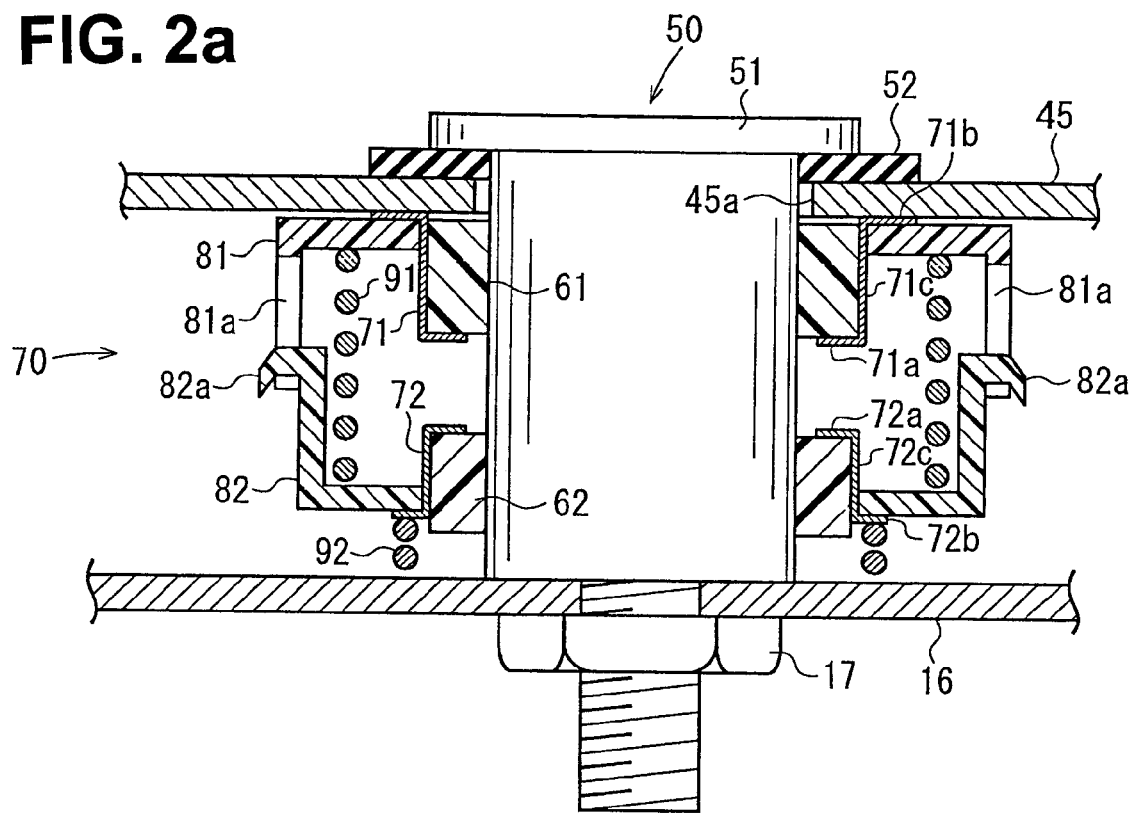
FIGS. 2(a) and 2(b) are cross-sectional views of the horn switch device depicted in FIG. 1.
Figure 2B:
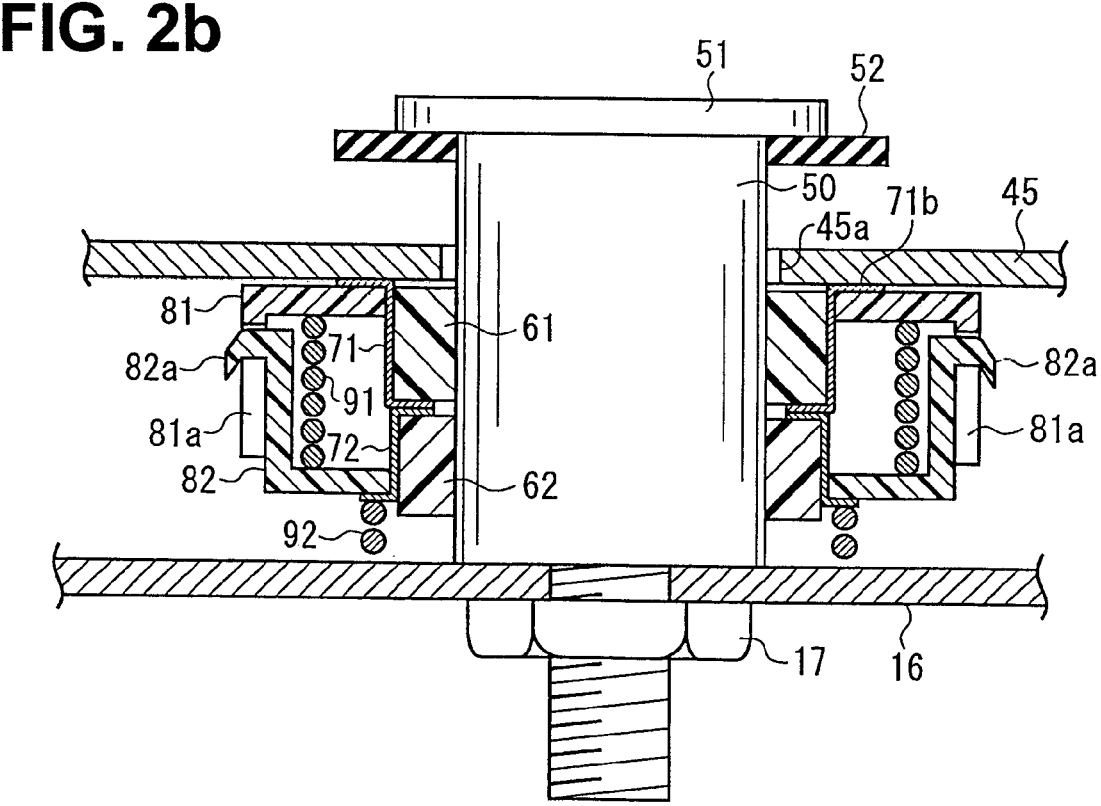

FIGS. 2(a) and 2(b) are enlarged views of the horn switch device depicted in FIG. 1. FIG. 2(a) shows "an undepressed" state in which a module cover 40 is not depressed, and FIG. 2(b) shows "a module-cover depressed state" in which the module cover 40 is depressed to sound a horn.

The airbag system 1 is a driver-seat airbag system disposed in the center (a base 101) of a steering wheel 100. The airbag system 1 includes a metal retainer 10, an airbag 20 mounted to the retainer 10 with an airbag-fixing ring 24, an inflator 30 for inflating the airbag 20, a synthetic-resin module cover 40 that covers the folded airbag 20, and a horn switch device 70.

According to the first embodiment of the invention, the module cover 40 is a retractable body. The module cover 40 has a groove-like tear line 40a. When the airbag 20 is inflated by the inflator 30, the module cover 40 is cleaved along the tear line 40a.

The retainer 10 has a substantially rectangular main plate 11. The main plate 11 has an opening 12 for the inflator 30 to pass through. Around the opening 12 are provided through holes for stud bolts 25 extending from the airbag-fixing ring 24.

An anchor piece 14 extends downward (i.e., in FIG. 1, in the direction opposite to the occupant of the vehicle) from the outer rim of the main plate 11 of the retainer 10. The anchor piece 14 is used to fix the airbag system 1 to the steering wheel 100. The anchor piece 14 has openings 14a for bolts or rivets to pass through. The steering wheel 100 has an airbag-system mounting piece 102 rising from the base 101 thereof. The mounting piece 102 also has an opening 102a for a bolt or a rivet to pass through.

In mounting the airbag system 1 to the steering wheel 100, the anchor piece 14 is placed on the mounting piece 102, and they are joined with a bolt or a rivet 103 through the openings 14a and 102a. The openings 14a and 102a may be screw sections for bolts.

An enclosure 15 extends upward (i.e., in FIG. 1, toward the occupant) from the outer rim of the main plate 11 of the retainer 10. An extension 16 extends laterally (to the side of the airbag system 1) from the distal end of the enclosure 15 in the standing direction. In this embodiment, the extension 16 is an unmoving body.

To the extension 16 is fixed a nut 17, to which the lower end of a guide shaft 50 is threaded.

The airbag 20 has a structure in which the periphery of an inflator insertion hole 22 thereof is placed on the periphery of the inflator opening 12 of the retainer main plate 11, on which the airbag-fixing ring 24 is placed. The stud bolts 25 are passed through the bolt insertion holes provided around the inflator insertion hole 22 of the airbag 20. Each stud bolt 25 is then passed through a bolt insertion hole of the retainer 10. The stud bolt 25 is then passed through a bolt insertion hole of a flange 31 of the inflator 30, on which a nut 26 is tightened. The airbag 20 and the inflator 30 are thus fixed to the retainer 10.

The module cover 40 has a main surface 41 that faces the occupant and a leg 42 extending from the back of the main surface 41. The leg 42 is molded integrally with the main surface 41 by injection molding of synthetic resin, and has a substantially rectangular frame shape similar to the enclosure 15 of the retainer 10. The periphery 41a of the main surface 41 overhangs outward from the leg 42.

The leg 42 provides a mount for an overhang 45. The overhang 45 extends outward in the direction perpendicular to the direction in which the module cover 40 retracts. The overhang 45 has an opening 45a for the guide shaft 50 to pass through.

As shown in FIGS. 2(a) and 2(b), the lower end of the guide shaft 50 is threaded into the nut 17 of the extension 16 to be fixed to the extension 16, and extends from the extension 16 toward the occupant. The upper end of the guide shaft 50 projects upward relative to the overhang 45 through the opening 45a, and has a flange 51 at the upper end as a stopper. Between the flange 51 and the overhang 45 is interposed a washer 52 made of an electrical insulation material such as rubber.

A first slider 61 on the side of the overhang 45 and a second slider 62 on the side of the extension 16 are slidably fitted around the outer circumference of the guide shaft 50. Both of the sliders 61 and 62 are made of an electrically insulating material such as synthetic resin.

A first contact member 71 is fitted on the slider 61; a second contact member 72 is fitted on the slider 62.

The first contact member 71 has a cylindrical part 71c, an inward collar 71a extending inward from one end of the cylindrical part 71c, and an outward collar 71b extending outward from the other end of the cylindrical part 71c. The second contact member 72 has a cylindrical part 72c, an inward collar 72a extending inward from one end of the cylindrical part 72c, and an outward collar 72b extending outward from the other end of the cylindrical part 72c.

The inward collar 71a of the first contact member 71 is disposed along the lower surface of the slider 61, and the inward collar 72a of the second contact member 72 is disposed along the upper surface of the slider 62; the collars 71a and 72a are disposed to face each other.

The outward collar 71b of the first contact member 71 overlaps with the overhang 45. A first bracket 81 is disposed so as to retain the collar 71b. The first bracket 81 has a guide slit 81a extending in parallel with the axis of the guide shaft 50.

A second bracket 82 overlaps with the outward collar 72b of the second contact member 72 from the side opposite to the extension 16. The bracket 82 has a projection 82a that is in engagement with the guide slit 81a.

A first coil spring 91 is interposed between the brackets 81 and 82 to push the brackets 81 and 82 in a separating direction. A second coil spring 92 is interposed between the outward collar 72b of the second contact member 72 and the extension 16 to push the outward collar 72b and the extension 16 in a separating direction. In this embodiment, the first coil spring 91 has a spring constant larger than that of the second coil spring 92.

The horn-sounding action of the steering wheel 100 equipped with the airbag system 1 including the horn switch device 70 will now be described.

As shown in FIG. 2(a), before the module cover 40 is depressed, the contact members 71 and 72 are apart from each other.

When the module cover 40 is depressed, the sliders 61 and 62 slide along the guide shaft 50, so that the first and second contact members 71 and 72 descend. With the descent, the second coil spring 92, which has a smaller spring constant, is first compressed, and then the first coil spring 91 is compressed.

The extension 16 extends from the retainer 10 fixed to the steering wheel 100, so that the extension 16 is not displaced even if the module cover 40 is depressed. Also, the guide shaft 50 fixed to the extension 16 is not displaced.

As the first and second contact members 71 and 72 are pushed down, the contact members 71 and 72 are finally brought into contact with each other, as shown in FIG. 2(b), to sound the horn.

On release from the module cover 40, the first and second contact members 71 and 72 and the module cover 40 are pushed up by the repulsive force of the coil springs 91 and 92 to return to the state shown in FIG. 2(a). The contact members 71 and 72 are thus pushed apart to stop sounding the horn.

In the horn switch device 70, as described above, when the module cover 40 is depressed, the coil spring 92, which has a smaller spring constant, is first compressed to allow the module cover 40 to be pushed lightly, thereby providing preferable operability. Since the two coil springs 91 and 92 are employed, vibration from the vehicle body can easily be absorbed. Accordingly, even if the distance between the contact members 71 and 72 is small, the contact members 71 and 72 are not brought into contact with each other by the vibration.

In the first embodiment, both of the first and second contact members 71 and 72 are mounted to or supported by the module cover 40, so that they can be positioned easily and accurately. This reduces the difficulty in assembling the horn switch device 70 or the airbag system 1.

While in the above-described embodiment the spring constant of the first coil spring 91 is larger than that of the second coil spring 92, the spring constant values may be reversed.

Figure 3:
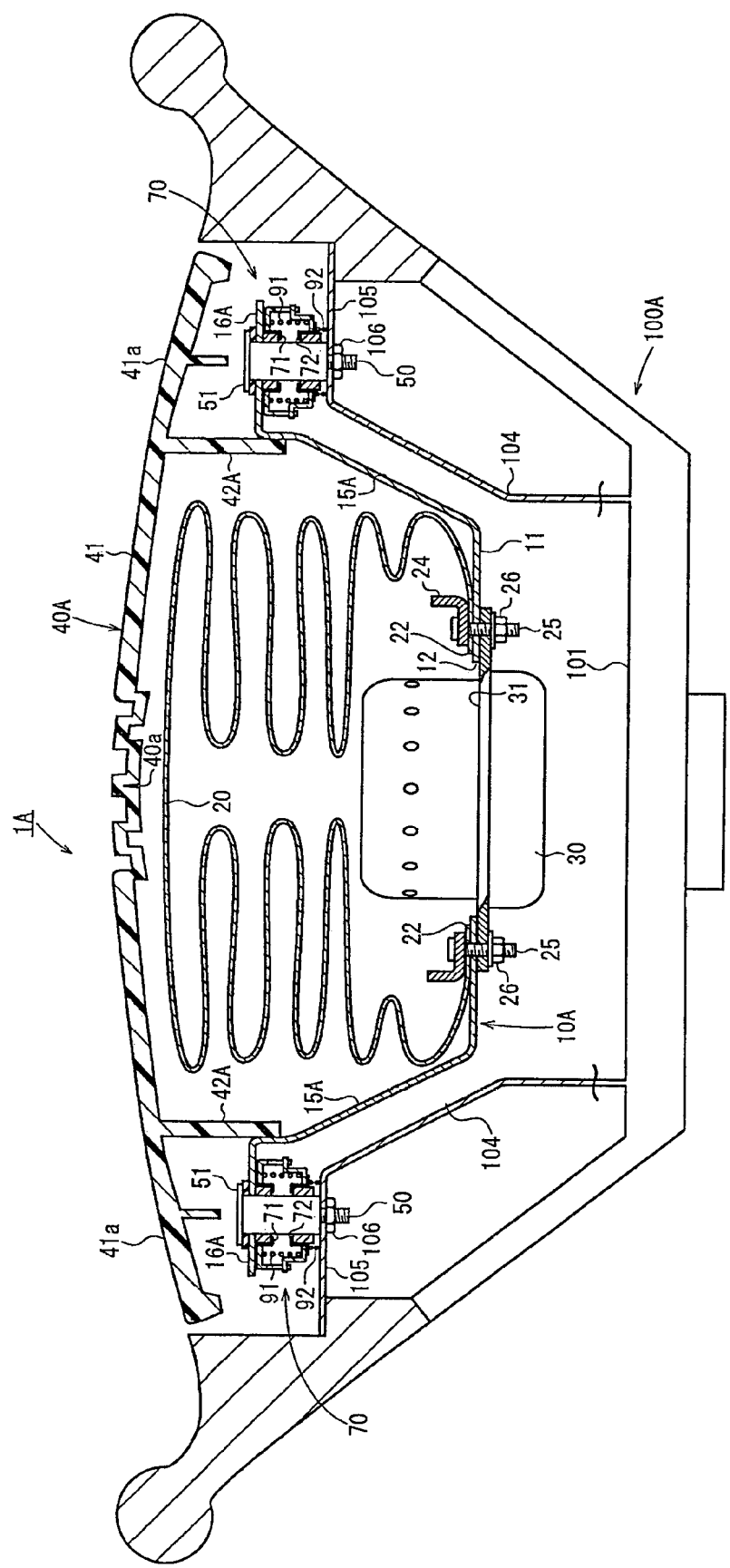
FIG. 3 is a cross-sectional view of a steering wheel equipped with an airbag system including a horn switch device according to a second embodiment of the invention.

While the above-described embodiment has a structure in which only the module cover is retracted by depression, the invention can also be applied to an airbag system in which the module cover and the retainer move vertically together. FIG. 3 is a cross-sectional view of a steering wheel 100A equipped with an airbag system 1A with such a structure according to a second embodiment of the invention.

Figure 4A:
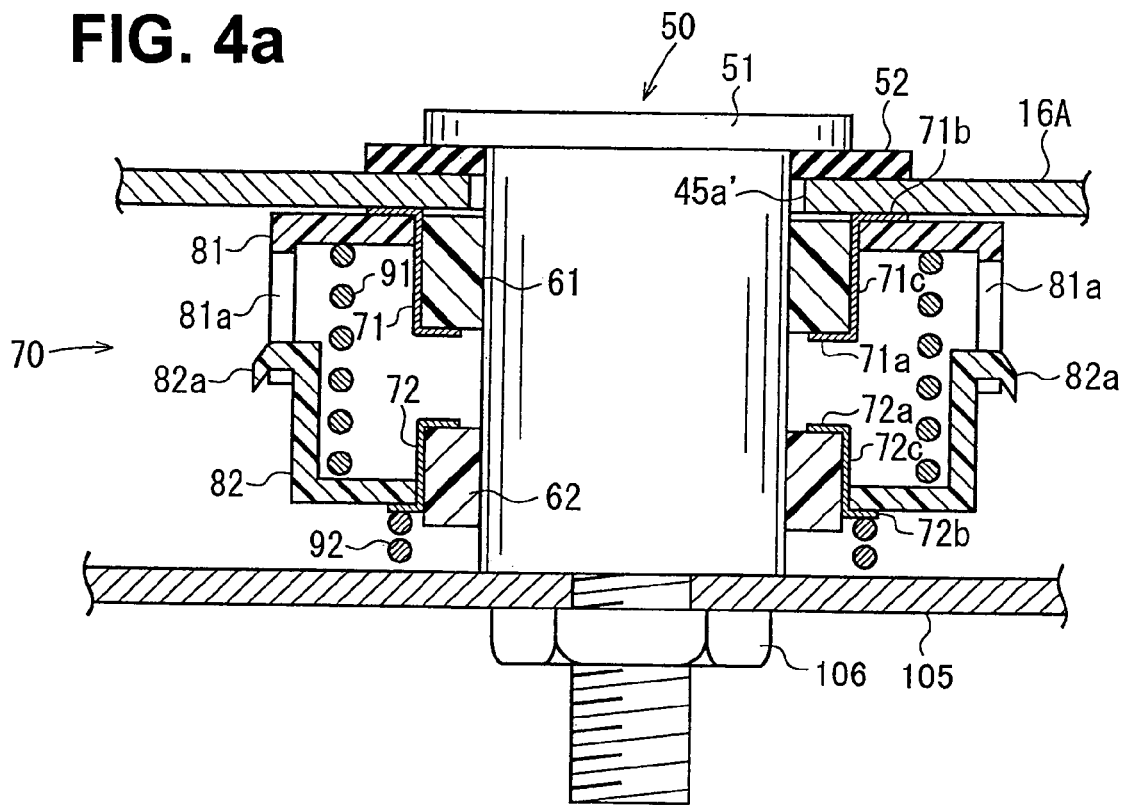
FIGS. 4(a) and 4(b) are cross-sectional views of the horn switch device depicted in FIG. 3.
Figure 4B:
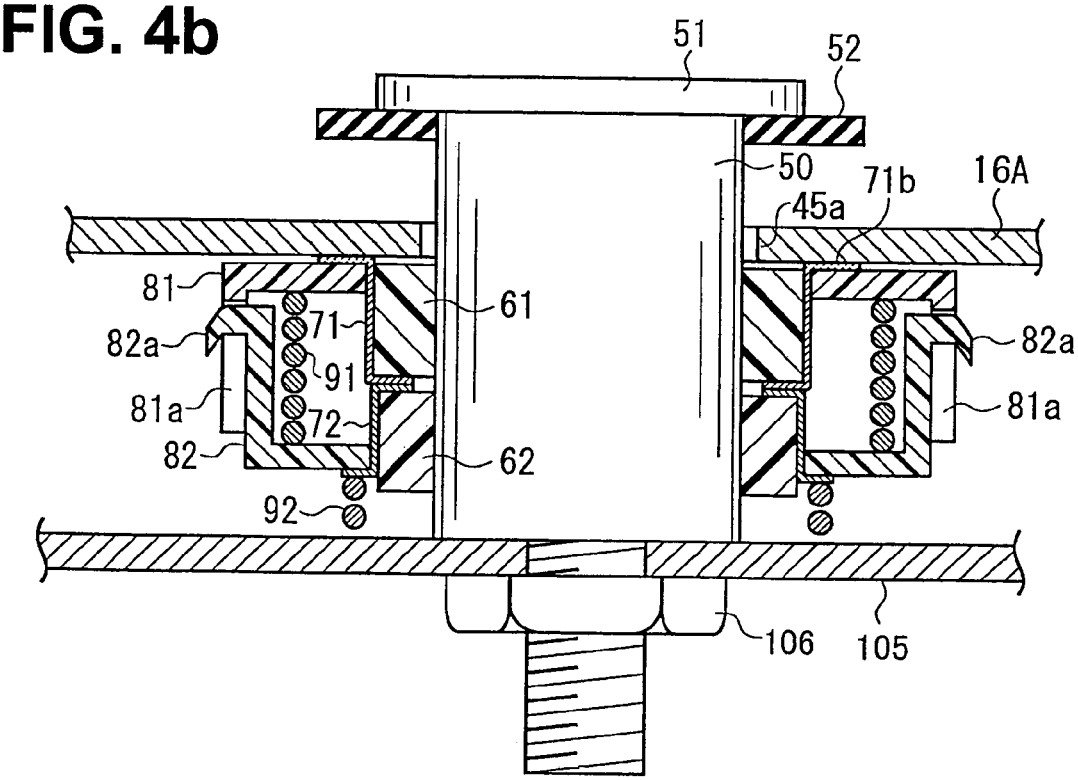

FIGS. 4(a) and 4(b) are enlarged views of the horn switch device depicted in FIG. 3. FIG. 4(a) shows "an undepressed" state in which a module cover is not depressed, and FIG. 4(b) shows "a module-cover depressed state" in which the module cover is depressed to sound a horn.

The airbag system 1A also includes a retainer 10A, an airbag 20 mounted to the retainer 10A with a ring 24, an inflator 30 for inflating the airbag 20, a module cover 40A that covers the folded airbag 20, and a horn switch device 70.

The retainer 10A of this embodiment also has a substantially rectangular main plate 11. The airbag 20 and the inflator 30 are mounted to the main plate 11, whose mounting structure is the same as that of the airbag system 1 depicted in FIG. 1.

An enclosure 15A extends upward (i.e., in FIG. 3, toward the occupant) from the outer rim of the main plate 11 of the retainer 10A. An extension 16A extends laterally (to the side of the airbag system 1A or in the direction perpendicular to the direction in which the airbag system 1A retracts (vertically in FIG. 3)), from the distal end of the enclosure 15A in the standing direction.

The module cover 40A has a main surface 41 that faces the occupant and a leg 42A extending downward (i.e., in FIG. 3, in the direction opposite to the occupant) along the inner wall of the enclosure 15A from the back of the main surface 41. The leg 42A is fixed to the enclosure 15A with a fixing member (not shown) such as a rivet.

In this second embodiment, airbag-system supporting pieces 104 extend from the steering wheel 100A along the outer wall of the enclosure 15A. The supporting pieces 104 are provided in a number equal to the number of extensions 16A, and are disposed such that the respective ends face the extensions 16A from below. At the end of each supporting piece 104 is provided a facing part 105 that extends to the side of the airbag system 1A (in parallel with the direction in which the extension 16A extends) and faces the lower surface of the extension 16A. In this embodiment, the facing part 105 is an unmoving body. To the facing part 105, a nut 106 for fixing a guide shaft is fixed.

In this second embodiment, the extension 16A has an opening 45a' (see FIGS. 4(a) and 4(b)), through which the guide shaft 50 passes. The lower end of the guide shaft 50 is threaded into the nut 106 at the facing part 105 to be fixed to the facing part 105, and extends upward from the facing part 105. Also in this embodiment, a flange 51 is provided as a stopper at the upper end of the guide shaft 50. Between the flange 51 and the extension 16A is interposed an electrically insulating washer 52 made of rubber or the like.

Accordingly, in the second embodiment of the invention, the entire airbag system 1A moves along the guide shaft 50.

Also in the second embodiment, the horn switch device 70 is disposed between the extension 16A and the facing part 105 such that it is fitted around the guide shaft 50. The horn switch device 70 is substantially the same as that shown in FIGS. 2(a) and 2(b). In this embodiment, the overhang 45 in FIGS. 2(a) and 2(b) is replaced with the extension 16A, and the extension 16 is replaced with the facing part 105. Specifically, in this second embodiment, the first slider 61 is disposed on the side of the extension 16A, and the second slider 62 is disposed on the side of the facing part 105, as shown in FIGS. 4(a) and 4(b). The outward collar 71b of the first contact member 71 overlaps with the extension 16A. The second coil spring 92 is interposed between the outward collar 72b of the second contact member 72 and the facing part 105.

Also in the horn switch device 70 of this second embodiment, the first coil spring 91 has a spring constant larger than that of the second coil spring 92.

The remaining structure of this second embodiment is the same as that of the first embodiment depicted in FIGS. 1 and 2(a) and 2(b). The same reference numbers of FIGS. 3 and 4(a) and 4(b) as those of FIGS. 1 and 2(a) and 2(b) indicate the same components;

The horn-sounding action of the steering wheel 100A equipped with the airbag system 1A having the horn switch device 70 will be described.

As shown in FIG. 4(a), before the module cover 40A is depressed, the contact members 71 and 72 are apart from each other.

When the module cover 40A is depressed, the entire airbag system 1A moves downward. Along with that, the sliders 61 and 62 slide along the guide shaft 50, so that the first and second contact members 71 and 72 descend. With the descent, the second coil spring 92, which has a smaller spring constant, is first compressed, and then the first coil spring 91 is compressed.

The facing part 105 (extending from supporting piece 104) is integrated with the steering wheel 10A, so that it is not displaced even if the module cover 40A is depressed. Also the guide shaft 50 fixed to the facing part 105 is not displaced.

As the first and second contact members 71 and 72 are pushed down, the contact members 71 and 72 come into contact with each other, as shown in FIG. 4(b), to sound the horn.

On release from the module cover 40A, the first and second contact members 71 and 72 and the extension 16A are pushed up by the repulsive force of the coil springs 91 and 92, so that the entire airbag system 1A returns to the state shown in FIG. 4(a). This separates the contact members 71 and 72 so as to stop sounding the horn.

While the spring constant of the first coil spring 91 of this second embodiment is also larger than that of the second coil spring 92, the spring constant values may be reversed.

The above-described embodiments are only examples of the invention. The invention is not necessarily limited to the embodiments described herein.

The disclosures of Japanese Patent Application Nos. 2004-366356 filed on Dec. 17, 2004; 2005-11775 filed on Jan. 19, 2005; and 2005-183679 filed on Jun. 23, 2005, are incorporated herein.

What is claimed is:

1. A horn switch device comprising:
   a retractable body capable of being retracted by depression;
   an unmoving body facing said retractable body;
   a guide shaft arranged between the retractable body and the unmoving body,
   a first biasing member and a second biasing member interposed between said retractable body and said unmoving body, for biasing said retractable body in a restoring direction; and
   a first contact member and a second contact member surrounding the guide shaft, both of said contact members being attached to, and moving with, said retractable body, and capable of contacting each other by movement of said retractable body,
   wherein said first biasing member pushes said first contact member and said second contact member apart, and said second biasing member pushes said second contact member toward said first contact member.

2. The horn switch device according to claim 1, wherein said first biasing member and said second biasing member are springs, each having a different spring constant.

3. The horn switch device according to claim 1, wherein said retractable body is a module cover of an airbag system.

4. The horn switch device according to claim 3, wherein said unmoving body is a member extending from a retainer of said airbag system.

5. The horn switch device according to claim 1, wherein said retractable body is an airbag system.

6. The horn switch device according to claim 5, wherein said unmoving body is a steering wheel or a member extending from said steering wheel.

7. A horn switch device comprising:
   a retractable body capable of being retracted by depression;
   an unmoving body facing said retractable body;
   a first biasing member and a second biasing member interposed between said retractable body and said unmoving body, for biasing said retractable body in a restoring direction;
   a first contact member and a second contact member, both of said contact members being attached to, and moving with, said retractable body, and capable of contacting each other by movement of said retractable body, wherein said first biasing member pushes said first contact member and said second contact member apart, and said second biasing member pushes said second contact member toward said first contact member, and
   a guide shaft fixed to said unmoving body, said pair of contact members being slidably attached to the guide shaft and biased upwardly by said second biasing member.

8. The horn switch device according to claim 7, further comprising first and second sliders slidably attached to the guide shaft, said first slider having said first contact member and said second slider having said second contact member.

9. An airbag system comprising a horn switch device, wherein said horn switch device is the horn switch device according to claim 1.

10. A steering wheel comprising a horn switch device, wherein said horn switch device is the horn switch device according to claim 1.

11. A steering wheel equipped with an airbag system comprising a horn switch device, wherein said airbag system is the airbag system according to claim 9.

12. A horn switch device according to claim 1, wherein the first and second biasing members surround the guide shaft.

* * * * *